April 18, 1967     R. J. ROWEKAMP     3,314,414

TROUGHS-IN-A-POOL SOLAR COLLECTOR

Filed May 1, 1964

INVENTOR
RICHARD J. ROWEKAMP

3,314,414
TROUGHS-IN-A-POOL SOLAR COLLECTOR
Richard J. Rowekamp, 3626 Glenmore Ave.,
Cincinnati, Ohio 45211
Filed May 1, 1964, Ser. No. 364,236
3 Claims. (Cl. 126—271)

This invention relates to a solar collector, which is a variation of the pan-in-a-pan heat and energy accumulator described in application Serial No. 306,640, filed Sept. 4, 1963 and the pans-in-a-pool solar heat and energy accumulator described in application Serial No. 311,288, filed Sept. 23, 1963. More particularly, this invention repeats, in a slightly different way, the principle outlined in the above two applications whereby water in a smaller container heated by sunlight is enclosed within a larger empty container so that a dead air space is created around the top and sides of the smaller container, which helps to heat up the water to a very high temperature. The water in the smaller container is heated, first, by the sun shining into it, and also by the hot air and additional hot metal surrounding it.

Tests on this type of solar collector during the summer, fall, and winter of 1963 and during the spring of 1964 confirm conclusively that the water in the smaller container is heated by a combination of radiation, conduction, and convection of solar heat, and that the principal heating effect results mostly from radiation and conduction, with convection also aiding in the heating effect; also, that convection is the principal cause of heat losses from the collector. Therefore, double glazing of such collectors is warranted, as it reduces heat losses. During this past winter, water in this type of solar collector was heated to 120° F. twice a day on clear days when the weather temperature was zero or slightly above zero. Temperatures ranging between 100° F. and 135° F. was possible even if the day was partly cloudy. Good results were obtained two out of every three days, and this collector has proven that it has wonderful potentials for house heating as well as for producing high temperature water for the solar powerplant described in my application Serial No. 192,390, now Patent No. 3,152,442. Now that spring has arrived, water has been heated to 160° F. twice a day whenever the weather is clear, and to 140° F. twice a day when it is part cloudy.

The troughs-in-a-pool solar collector described herein is expected to produce cheaper hot water than the pan-in-a-pan or the pans-in-a-pool collectors, because considerable piping is eliminated, and also because the high initial cost of dies for making the pans is eliminated. The metal troughs can be fabricated in a sheet metal shop through the use of brake and welding equipment which are the standard equipment of the sheet metal shop.

The troughs would resemble a series of gutters running parallel to each other from one end of a larger pool to the other end, and separated from each other by an intermediate and integral sheet of metal which conducts additional heat to the water held in the trough or gutter; and the entire assembly is so arranged so that there is an air gap around the sides and top of the water to be heated in the solar collector. The essential features of this type of solar device, which produces relatively high-temperature water, is that additional metal must be available which can conduct extra heat to the smaller container within the larger container; and the air gap around the side of the water to be heated is very essential because this makes the conduction possible, and it also holds hot air around the water, which helps in the double heating effect. The air gap at the top of the collector helps to reduce heat losses, since air is a por conductor of heat. A double-heating effect results, and water can be heated quicker and to much higher temperatures than water which is held in a full pool of water. Generally speaking, the troughs-in-a-pool collector will produce temperatures in water which are one hundred degrees higher than the weather temperature. It produces water which is twenty-five degrees higher than that in a double-glazed collector, and forty degrees higher than in a single-glazed collector.

An object of this invention is to provide a pool or chamber which contains a series of individual trough or gutters which are separated from each other by an air gap on adjoining sides, and which are formed of a continous sheet of metal. The troughs will hold water to be heated by sunlight, and the additional metal which doesn't hold water will conduct solar heat energy to the water in the troughs. The air-gap on the sides of the troughs helps to heat the water through convection, and the general arrangement exposes more water to metal, which results in the double-heating effect. Sunlight, beaming through the transparent panels mounted on the upper portion of the pool, heats the water in the troughs by radiation; the additional metal conducts extra heat to the water in the troughs, and the hot air created by the air gap also helps in the heating effect through convection.

Another object of this invention is to describe the phenomena whereby an aluminium pan, tray, or trough, containing water to be heated by sunlight, will turn "black" through the action of sunlight and water. No special acid treatment, as described in application Serial No. 274,748, filed April 22, 1963, now abandoned, is required, and this will result in a considerable cost reduction. Early tests with aluminum pans containing water and exposed to sunlight showed that the aluminum would turn black wherever the water touched the pan: the bottom portion, containing the water, became "black;" while the upper portion, which contained no water, maintained its light silver aluminum color. Aluminum pans used in early tests were of unknown "alloy content," and some turned very black, while others did not; yet, generally speaking, practically all aluminum pans were affected by sunlight and water, in that they turned some shade of black. This resulted in the conclusion that practically any kind of aluminum pan containing an alloy will turn "black" when in contact with sunlight and water; and, more particularly, will turn "black" when covered with a glass panel which causes the water in it to heat up to a rather high temperature. Since the sheet aluminum, from which aluminum pans are made, normally contain such alloys as silicon, manganese, copper, iron, zinc, chrome, and magnesium, it was felt that the presence of some of these alloys in the aluminum pan was causing the "black" color. Of course, it was already known that aluminum containing alloys of silicon and manganese, and oxidized by sulfuric acid, would turn a deep black. Also, since most city water contains small quantities of chlorine, it was felt that chlorine might be helping in the blackening effect; in addition, fluoride is added to the processed city water used at my home in Wyoming (a suburb of Cincinnati), and it is felt that fluoride is also helping in the blackening effect. Tests were then conducted to see what process will produce the blackest color in an aluminum collector when it is in contact with sunlight and water, and the findings are reported herewith. Ordinary table salt was added to processed city water, and aluminum pans of unknown alloy-content, that had already changed to black, became much blacker. Sheet aluminum of known-alloy-content were purchased, and the following results were observed: one sample, containing 1% silicon and very small quantities of manganese, copper, and iron, was placed in a glass covered pan, and exposed to sunlight and water, which contained normal amounts of chlorine and fluoride; and it turned very black after a few days exposure; ordinary table salt was added to the water, and the black color deepened. Another sample, containing 1% to 1½% manganese and ½% silicon, was tested in the same manner, and it turned black, but not as deep a black as the one containing 1% silicon; salt water deepened the black color somewhat. Another sample containing 0.4% silicon and 0.15% manganese was tested, and after several days, it gradually blackened to a medium shade of black; salt water didn't affect it very much. Another sample containing 0.45% silicon, 0.6% manganese, and 4% copper was tested, and it gradually darkened to a medium shade of black; salt water didn't affect it very much. Another sample containing 0.45% silicon, 0.1% copper, 2% magnesium, and 0.1% manganese was tested, and it wasn't affected very much, and remained a silvery color. A bleaching compound, mixed with water, was next poured on all the above samples, and the following results were observed: the black color in the sample containing 1% silicon "washed out," while the ones containing both silicon and manganese retained their black color. This indicated that manganese is a desirable alloy, as it adds permanence to the black color. Several other tests were conducted to see what other kinds of liquids would have on aluminum collectors: neither vinegar nor tannic acid had any effect on aluminum in sunlight; ammonia turned the interior surface of the aluminum collector into a brownish color.

Results of the tests indicated that a very inexpensive black interior surface can be obtained in a solar collector comprised of aluminum merely by selecting aluminum sheet metal containing 1% silicon and by using processed city water which contains small quantities of chlorine and/or fluoride; during the normal course of use, the portion of the collector exposed to sunlight and water will turn "black" through oxidation. If a deeper black color is desired, a few batches of salt water can be run through the pans, trays, or troughs. However, the use of aluminum containing 2% silicon and 1% manganese appears to be warranted, as it probably will result in a very deep and permanent black color.

Another object of this invention is to provide a means for double glazing the solar collector so that heat losses will be reduced.

The above and other objects and features of the invention will be apparent to those skilled in the art to which this invention pertains from the following detailed description and the drawings, in which.

In the following detailed description and the drawings, like reference characters indicate like parts.

Figure 1:
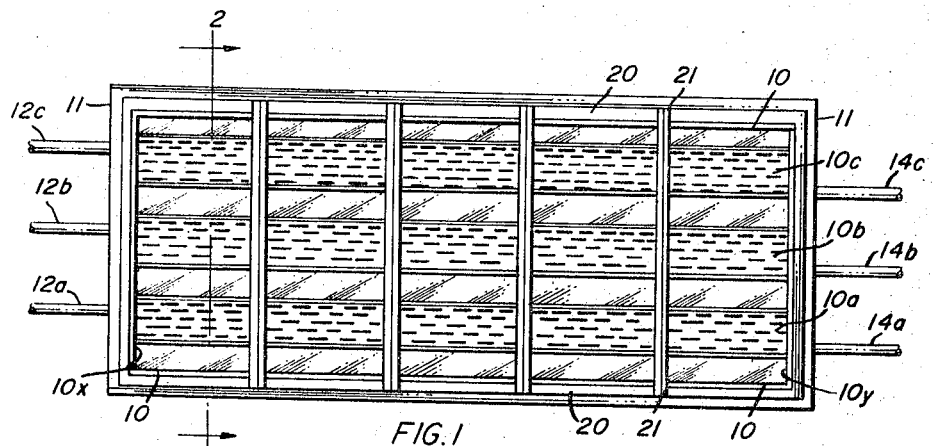
FIG. 1 is a schematic plan view showing a series of metal troughs set within a much larger empty pool or chamber, and constructed in accordance with an embodiment of this invention.

In FIG. 1 is shown a series of troughs 10a, 10b, and 10c which set within pool 11. The pool 11 faces in a southwardly direction toward the sun if in the Northern Hemisphere (and in a northwardly direction if in the Southern Hemisphere). Troughs 10a, 10b, and 10c run east-west across the pool, from one side wall to the opposite side wall of the pool 11, and each is spaced apart from the other, yet linked together by a continuous piece of sheet metal. An inlet pipe 12a permits entry of water 13 (FIG. 2) into trough 10a; and a discharge pipe 14a permits removal of heated water therefrom. An inlet pipe 12b permits entry of water 13 into trough 10b; and a discharge pipe 14b permits removal of heated water therefrom. An inlet pipe 12c permits entry of water 13 into trough 10c; and a discharge pipe 14c permits removal of heated water therefrom. The series of troughs in the pool need not be limited to three; there could be as many as six or seven.

Figure 2:
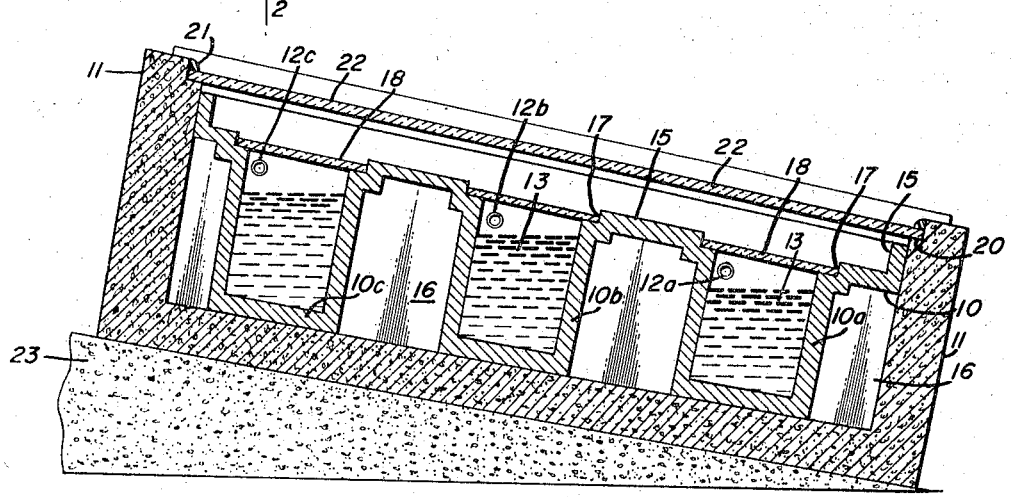
FIG. 2 is an enlarged view in section taken on the line 2—2 in FIG. 1.

In FIG. 2 are shown details of the construction of the troughs-in-a-pool solar collector. Troughs 10a, 10b, and 10c are formed of a continuous, long, wide piece of sheet metal 10, which is formed by a brake machine in a sheet metal shop. The troughs, although spaced apart, are linked together by sheet metal 10. The sheet metal 10 can be either untempered aluminum or another suitable untempered sheet metal which later can be processed or "baked" to a black porcelain enamel finish. If untempered aluminum sheet metal is used, it is preferred that it contain 2% silicon alloys and 1% manganese alloys, which will automatically provide a black color to aluminum sheet metal 10 when it is oxidized when in contact with sunlight and water. The sheet metal 10 is bent to form a series of U-shaped troughs or gutters which are so spaced apart from each other that about half the area of the solar collector would be the water in the troughs, and the other half would be exposed metal, which conducts solar heat to the water. For purpose of identification, the exposed metal has been numbered 15. An air-gap 16 is formed below exposed metal 15, so that all troughs have this air gap on each side of them.

At the top of each trough, there is an indentation or shoulder 17 so that a glass cover 18 can be placed on top of the trough. The glass cover 18 would be cut to fit very tightly into shoulder 17 so that no glazing compound would be needed to hold it in place.

It will be necessary to weld a piece of metal to sheet metal 10 so as to make the east and west walls of the troughs-in-a-pool collector water tight. Therefore, sheet metal 10x (FIG. 1) will be welded to sheet metal 10 to form the west wall; and inlet pipes 12a, 12b, and 12c are welded to sheet metal 10x. Likewise, sheet metal 10y (FIG. 1) will be welded to sheet metal 10 to form the east wall; and discharge pipes 14a, 14b, and 14c are welded to sheet metal 10y.

In FIG. 2, the pool 11 is constructed exactly as described in application Serial No. 289,988, now Patent No. 3,161,193: it is constructed of lightweight insulating concrete; it has a base, front, rear, and end walls, but in its use with the troughs-in-a-pool collector, all walls are of equal height; it has a shoulder 20 along the upper-inner portion of all walls, and this shoulder 20, together with inverted T-mullion 21, provide support for glass panes 22; the T-mullions 21 are anchored into the front and rear walls of the pool, and the glass panes 22 are held in place by a glazing compound. The pool 11 rests upon earth 23 which has been graded to slant facing the sun. It is the intention of this invention to point out that it isn't absolutely necessary that lightweight insulating concrete be used to form the structure of the pool, and it isn't necessary that graded earth be used to supply the slant toward the sun. A great variety of materials and methods could be used to provide support for the troughs-in-a-pool collector, and many such materials and methods have been described in previous applications 274,748, now abandoned, 306,640, 311,288. Neither is it necessary that the troughs 10a, 10b, and 10c be formed exactly as shown in FIG. 2. Sheet metal 10 could line the base and front and rear walls of the pool 11, and sheet metal 10x and 10y could be welded to it to make the pool water tight and to form the east and west walls. Troughs 10a, 10b and 10c could be made of a separate piece of sheet metal, and be welded to sheet metal 10, 10x, and 10y, and be so arranged so that there is an air gap 16 between each trough. Exposed metal 15, instead of being on the top adjoining each trough, would be along the base of the pool 11. Each trough would have a glass cover 18, and shoulders 17 could be formed in the upper portion of its walls; and could produce as much hot water as the troughs shown in FIG. 2.

Figure 3:
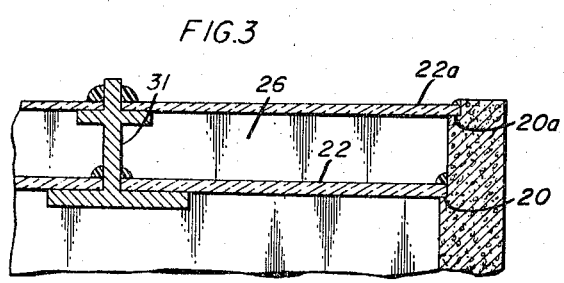
FIG. 3 is a fragmentary enlarged view in front elevation showing how the troughs-in-a-pool solar collector can be double glazed.

In FIG. 3 is shown a fragmentary view of the upper portion of pool 11, which has a special double glazing effect: inverted double-T-mullion 31 and double shoulders 20 and 20a support glass panes 22 and 22a, and thus create an air gap 26 between the two panes of glass. The double glazing effect results in higher temperatures and less heat losses.

Figure 4:
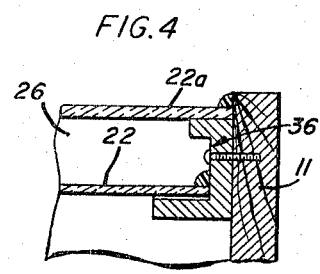
FIG. 4 is a fragmentary enlarged view in front elevation showing how a wood-frame pool can be double-glazed.

In FIG. 4 is shown a fragmentary view of the upper portion of pool 11, if it is constructed of a wood-frame, whereby a double glazing effect can be accomplished: glass panes 22 and 22a are supported by double angle bar 36 and by inverted double-T-mullion 31 (shown only in FIG. 3). An air gap 26 is created between the two panes of glass.

The troughs-in-a-pool solar heat and energy accumulator illustrated in the drawing and described above, is subject to structural modification without departing from the spirit and scope of the appended claims.

Having described my invention, what I claim as new and desire to secure by Letters Patent, is:

1. A batch-type heat accumulator capable of raising, by sunlight, the temperature of relatively large bodies of water to near the boiling point two or three times daily in summer; said heat accumulator comprising the combination of a series of U-shaped troughs enclosed within a much larger empty pool which forms an air gap around the top of the troughs; said pool also comprising a well insulated frame around the base and end walls of the troughs, and having a series of glass panes mounted on the upper portion of its walls; said glass panes being mounted on said pool so that they slant to face toward the sun; said troughs running parallel to each other in a horizontal direction through the pool so that they will hold said large bodies of water in a stationary position while they are being heated by sunlight; said troughs being formed from a continuous piece of untempered aluminum sheet metal which contains such alloys as silicon and manganese, which will cause the aluminum to turn black through the action of sunlight and water; said troughs being designed so that sunlight shines half upon the water in the troughs and half upon the bare metal connecting each individual trough; said troughs having an air gap along both their front and rear sides that is formed by the sheet metal; each of said troughs having an individual glass cover mounted upon the upper portion of its walls; means for introducing water into each individual trough, and means for periodically removing the heated water from each individual trough.

2. A batch-type heat accumulator capable of creating, by sunlight, relatively quick high temperatures in large bodies of water, which comprises a series of rather wide and deep U-shaped metal troughs, having a black interior surface, enclosed within a much larger insulated chamber; said troughs being formed of a continuous piece of sheet metal and having a base and front and rear walls of equal height extending upwardly from said base; said troughs having end walls comprising a separate and continuous piece of sheet metal that is welded to the continuous piece of sheet metal which forms the base and front and rear walls of the troughs; said troughs being elegonated, and running parallel to each other in a horizontal direction through said chamber, and spaced apart from each other so that there is an air gap along the front and rear walls of each trough; said troughs containing rather deep bodies of water; each of said troughs having an individual transparent cover mounted on the upper portion of its walls; said continous piece of sheet metal, from which the troughs are formed, being shaped so that there is half bare metal and half water exposed to sunlight; said chamber having a base and walls of equal height extending upwardly from said base; said walls of said chamber being higher than the walls of said troughs so that an air gap is created at the top of the troughs; said chamber being slanted to face toward the sun; said chamber being empty, except for air, and having transparent covers mounted on the upper portions of its walls; said arrangement permitting the water in the troughs to be heated directly by solar radiation and indirectly through conduction and convection of solar heat, creating a double heating effect; means for filling each individual trough with water, and means for periodically removing the solar heated water from each individual trough.

3. A batch type, quick high temperature heat accumulator for collecting solar energy in water, which comprises a large double glazed chamber surrounding a series of metal troughs containing rather deep bodies of water to be heated by sunlight; said large chamber being comprised of lightweight insulating concrete, and having a base and walls extending upwardly from said base; said chamber being empty, except for air, and having inverted double-T mullions and double shoulders built into the upper portion of its walls so that a double glazing effect can be achieved by mounting a series of glass covers between them; said troughs running parallel to each other in a horizontal direction from one end of the large chamber to the other end, and separated from each other by an intermediate and integral sheet of metal which conducts additional heat to the water in the troughs; said sheet of metal having a baked porcelain enamel finish; said troughs being U-shaped, and having shoulders on their upper walls into which a glass cover can be pressed; said metal troughs being so formed so that half of the area of the accumulator is water exposed to sunlight and the other half is bare metal exposed to sunlight; said bare metal linking together the adjoining troughs, and helping to create an air gap along the side of the troughs; said arrangement creating a double heating effect which causes sunlight to heat the water in the troughs to rather quick high temperatures through radiation, conduction, and convection of solar heat; means for introducing water into each trough, and means for periodically draining heated water from each trough.

References Cited by the Examiner
UNITED STATES PATENTS

| | | | |
|---|---|---|---|
| 1,130,870 | 3/1915 | Willsie | 126—271 X |
| 2,383,234 | 8/1945 | Barnes. | |
| 2,917,817 | 12/1959 | Tabor. | |
| 3,145,707 | 8/1964 | Thomason | 126—271 |
| 3,161,193 | 12/1964 | Rowekamp | 126—271 |

FOREIGN PATENTS

| | | |
|---|---|---|
| 1,023,132 | 12/1952 | France. |

CHARLES J. MYHRE, *Primary Examiner.*